(12) United States Patent
Durbecq et al.

(10) Patent No.: US 12,344,071 B2
(45) Date of Patent: Jul. 1, 2025

(54) COOLING MODULE AN ELECTRIC OR HYBRID MOTOR VEHICLE, COMPRISING A TANGENTIAL-FLOW TURBOMACHINE

(71) Applicant: Valeo Systemes Thermiques, Le Mesnil-Saint-Denis (FR)

(72) Inventors: Gael Durbecq, Le Mesnil-Saint-Denis (FR); Amrid Mammeri, Le Mesnil-Saint-Denis (FR); Erwan Etienne, Le Mesnil-Saint-Denis (FR); Kamel Azzouz, Le Mesnil-Saint-Denis (FR)

(73) Assignee: Valeo Systemes Thermiques

( * ) Notice: Subject to any disclaimer, the term of this patent is extended or adjusted under 35 U.S.C. 154(b) by 202 days.

(21) Appl. No.: 18/010,624

(22) PCT Filed: Jun. 16, 2021

(86) PCT No.: PCT/EP2021/066259
§ 371 (c)(1),
(2) Date: Dec. 15, 2022

(87) PCT Pub. No.: WO2021/255103
PCT Pub. Date: Dec. 23, 2021

(65) Prior Publication Data
US 2023/0256792 A1 Aug. 17, 2023

(30) Foreign Application Priority Data
Jun. 16, 2020 (FR) .................................. 2006282

(51) Int. Cl.
*B60H 1/00* (2006.01)
*B60H 1/32* (2006.01)
(Continued)

(52) U.S. Cl.
CPC ..... *B60H 1/00385* (2013.01); *B60H 1/00471* (2013.01); *B60H 1/3227* (2013.01);
(Continued)

(58) Field of Classification Search
CPC ..... B60K 11/04; F10P 5/02; F10P 5/06; F10P 11/10; B60H 1/3227; F25B 40/02;
(Continued)

(56) References Cited

U.S. PATENT DOCUMENTS 3,589,436 A * 6/1971 Anderson .......... B60H 1/00007
62/467
5,146,767 A * 9/1992 Kadle ..................... F25B 40/02
62/509
(Continued)

FOREIGN PATENT DOCUMENTS

FR 3028016 A1 5/2016
JP H11-321346 A 11/1999

OTHER PUBLICATIONS

International Search Report and Written Opinion issued in corresponding International Application No. PCT/EP2021/066259, mailed on Sep. 21, 2021 (10 pages).

*Primary Examiner* — Christopher R Zerphey
(74) *Attorney, Agent, or Firm* — Osha Bergman Watanabe & Burton LLP

(57) ABSTRACT

Cooling module (22) for an electric or hybrid motor vehicle (10), through which cooling module (22) an air flow (F) is intended to pass, comprising: —a set of heat exchangers (23) comprising: —a first heat exchanger (24) configured to be a condenser connected within an air conditioning circuit (A), and —a second heat exchanger (26) configured to be a low-temperature radiator connected within a thermal management circuit (B), —a tangential-flow turbomachine (30) configured so as to generate the air flow (F), the set of heat exchangers (23) further comprising a third heat exchanger (Continued)

(28) configured to be a sub-cooler connected within the air conditioning circuit (A), the third heat exchanger (28) being arranged within the set of heat exchangers (23) furthest upstream in the direction of the air flow (F).

8 Claims, 8 Drawing Sheets

(51) Int. Cl.
*B60K 11/04* (2006.01)
*F25B 40/02* (2006.01)
*F25B 43/00* (2006.01)
*F28D 21/00* (2006.01)

(52) U.S. Cl.
CPC ......... *B60H 1/32281* (2019.05); *B60H 1/323* (2013.01); *B60K 11/04* (2013.01); *F25B 40/02* (2013.01); *F25B 43/003* (2013.01); *F28D 2021/008* (2013.01); *F28D 2021/0084* (2013.01); *F28D 2021/0091* (2013.01)

(58) Field of Classification Search
CPC ............. F25B 43/003; F28D 2021/008; F28D 2021/0084; F28D 2021/0091
See application file for complete search history.

(56) References Cited

U.S. PATENT DOCUMENTS

| | | | | |
|---|---|---|---|---|
| 5,394,710 | A * | 3/1995 | Matsuo | F25B 40/02 165/113 |
| 5,628,206 | A * | 5/1997 | Baba | F28F 9/002 62/509 |
| 6,192,838 | B1 * | 2/2001 | Matsuo | F01P 11/10 123/41.11 |
| 7,497,287 | B2 * | 3/2009 | Kunikata | B60K 11/04 180/68.1 |
| 7,591,148 | B2 * | 9/2009 | Sanada | F25B 39/04 62/509 |
| 10,994,584 | B2 * | 5/2021 | Kim | F25B 1/005 |
| 11,097,610 | B2 * | 8/2021 | Han | F28D 1/0443 |
| 11,397,033 | B2 * | 7/2022 | Xie | F25B 41/24 |
| 11,712,962 | B2 * | 8/2023 | Maier | B60K 11/04 180/68.1 |

* cited by examiner

COOLING MODULE AN ELECTRIC OR HYBRID MOTOR VEHICLE, COMPRISING A TANGENTIAL-FLOW TURBOMACHINE

The present invention relates to a cooling module for an electric or hybrid motor vehicle, comprising a tangential-flow turbomachine.

A cooling module (or heat exchange module) of a motor vehicle conventionally comprises at least one heat exchanger and a ventilation device which is designed to generate a flow of air in contact with the at least one heat exchanger. The ventilation device thus makes it possible, for example, to generate a flow of air in contact with the heat exchanger, when the vehicle is at a standstill or travelling slowly.

In motor vehicles with a conventional thermal engine, the at least one heat exchanger has a substantially square form, with the ventilation device then being a blade fan, the diameter of which is substantially equal to the side of the square formed by the heat exchanger.

Conventionally, the heat exchanger is then placed facing at least two cooling openings, formed in the front face of the body of the motor vehicle. A first cooling opening is situated above the fender, while a second opening is situated below the fender. Such a configuration is preferred since the thermal engine also has to be supplied with air, the air intake of the engine being conventionally situated in the passage of the flow of air passing through the upper cooling opening.

However, electric vehicles are preferably only provided with cooling openings situated below the fender, even more preferably with a single cooling opening situated below the fender.

In fact, the electric motor does not need an air supply. Also, a decrease in the number of cooling openings and their size makes it possible to improve the aerodynamic characteristics of the electric vehicle. This also results in better autonomy and a higher top speed of the motor vehicle. Thus, according to the requirements of the manufacturers, for electric and hybrid vehicles, in particular in order to improve the coefficient of penetration into the air, the height of the heat exchangers present in these cooling openings is led to be reduced, and their thickness is led to be increased.

However, the stacking of the heat exchangers in the direction of the flow of air passing through them means that each heat exchanger positioned upstream affects the performance of the exchanger(s) placed downstream.

The objective of the present invention is thus to eliminate the disadvantages of the prior art at least partly, and to propose an improved cooling module which permits the best possible performance levels for the different heat exchangers.

The present invention thus concerns a cooling module for an electric or hybrid motor vehicle, said cooling module being designed to have a flow of air passing through it, and comprising:
  a set of heat exchangers comprising:
  a first heat exchanger configured to be a condenser connected within an air-conditioning circuit; and
  a second heat exchanger configured to be a low-temperature radiator connected within a heat control circuit;
  a tangential-flow turbomachine configured such as to generate the flow of air;
  the set of heat exchangers also comprising a third heat exchanger which is configured to be a sub-cooler connected within the air-conditioning circuit, said third heat exchanger being positioned within the set of heat exchangers which is furthest downstream in the direction of the flow of air.

According to one aspect of the invention, the second heat exchanger is positioned upstream from the first heat exchanger in the flow of air within the set of heat exchangers.

According to another aspect of the invention, the third heat exchanger is positioned upstream from the second heat exchanger.

According to another aspect of the invention, the second heat exchanger and the third heat exchanger are positioned on the same plane within the set of heat exchangers.

According to another aspect of the invention, the third heat exchanger is positioned below the second heat exchanger.

According to another aspect of the invention, the third heat exchanger is configured to permit at least one passage of a cooling fluid circulating in the air-conditioning circuit, the cooling fluid circulating in said passage circulating in the opposite direction to a passage, positioned facing, within the first heat exchanger.

According to another aspect of the invention, the third heat exchanger is configured to permit at least one passage of a cooling fluid circulating in the air-conditioning circuit, with the cooling fluid circulating in said passage in the same direction as in a passage, positioned opposite, within the first heat exchanger.

According to another aspect of the invention, the set of heat exchangers comprises a fourth heat exchanger configured to be a low-temperature radiator, and positioned downstream from the first heat exchanger in the flow of air.

According to another aspect of the invention, the fourth heat exchanger is connected to the heat control circuit in parallel with the second heat exchanger.

According to another aspect of the invention, the fourth heat exchanger is connected to an appended heat control circuit distinct from the heat control circuit to which the second heat exchanger is connected.

According to another aspect of the invention, the cooling module comprises a dehydrating cylinder, said dehydrating cylinder being connected within the air-conditioning circuit downstream from the first heat exchanger, between said first heat exchanger and the third heat exchanger, in the direction of circulation of a cooling circuit circulating in said air-conditioning circuit.

According to another aspect of the invention, the dehydrating cylinder is positioned on the same plane as the third heat exchanger within the set of heat exchangers.

According to another aspect of the invention, the dehydrating cylinder is positioned below the third heat exchanger.

According to another aspect of the invention, the cooling module comprises a first collector housing positioned downstream from the set of heat exchangers in the direction of circulation of the flow of air, and the dehydrating cylinder is positioned downstream from the set of heat exchangers within said first collector housing.

According to another aspect of the invention, the cooling module comprises a first collector housing positioned downstream from the set of heat exchangers in the direction of circulation of the flow of air, and the dehydrating cylinder is positioned downstream from the set of heat exchangers on the exterior of said first collector housing.

According to another aspect of the invention, he dehydrating cylinder is positioned in the low part of the first collector housing.

According to another aspect of the invention, the axis of extension of the dehydrating cylinder is positioned in parallel with the plane of the heat exchangers of the set of heat exchangers.

According to another aspect of the invention, the dehydrating cylinder is positioned such that its axis of extension is perpendicular to the axis of the height of the heat exchangers of the set of heat exchangers.

According to another aspect of the invention, the dehydrating cylinder is positioned such that its axis of extension is substantially on the same plane as the surface of the heat exchanger.

Other characteristics and advantages of the present intervention will become more clearly apparent from reading the following description, provided by way of non-limiting illustration, and from the appended drawings in which.

In the various figures, identical elements bear the same reference numbers.

The following embodiments are examples. Although the description refers to one or more embodiments, this does not necessarily mean that each reference relates to the same embodiment, or that the characteristics apply only to a single embodiment. Simple characteristics of different embodiments can also be combined and/or interchanged in order to provide other embodiments.

In the present description, certain elements or parameters can be indexed, such as, for example, first element or second element and also first parameter and second parameter or else first criterion and second criterion, etc. In this case, what is concerned is a simple indexing to differentiate and denominate elements or parameters or criteria that are similar but not identical. This indexing does not imply a priority of one element, parameter or criterion with respect to another and such denominations can easily be interchanged without departing from the scope of the present description. Neither does this indexing imply any chronological order for example in assessing any given criterion. In the present description, "placed upstream" means that an element is placed before another relative to the direction of circulation of a flow of air. By contrast, "placed downstream" is understood to mean that an element is placed after another relative to the direction of circulation of the flow of air.

Figure 1:
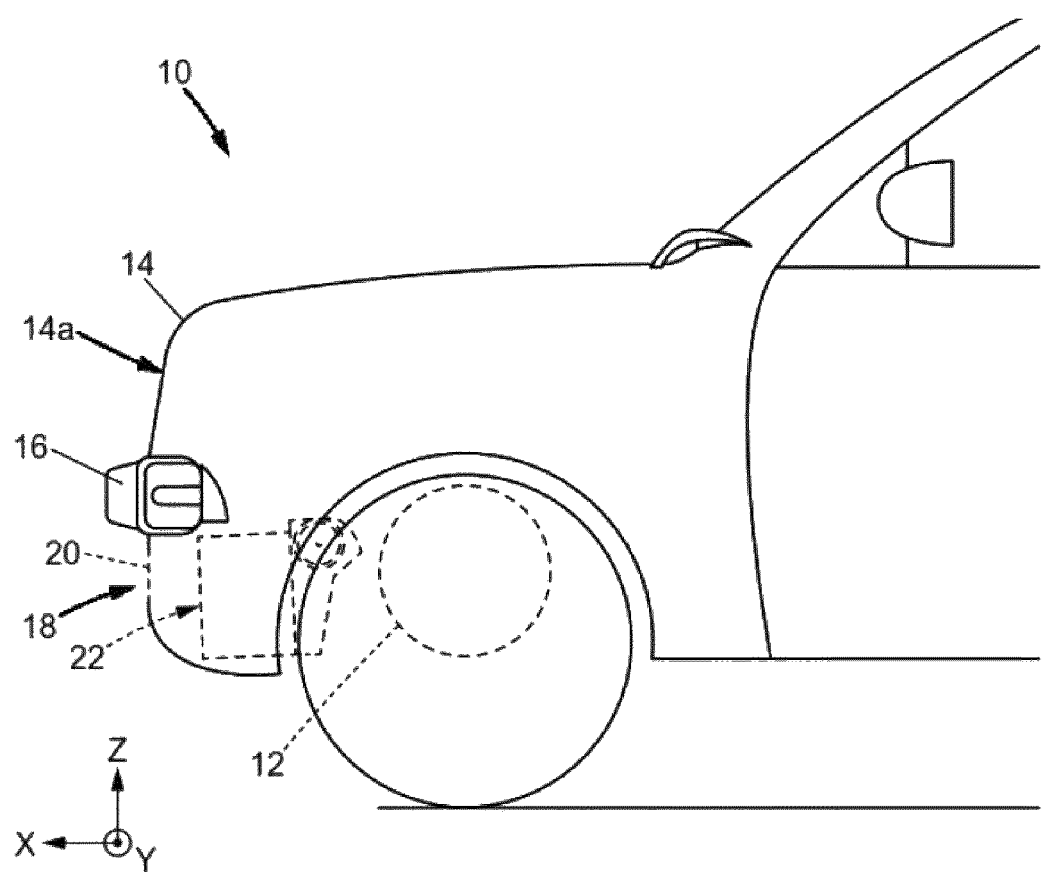
FIG. 1 shows a schematic representation of the front of a motor vehicle in side view.
Figure 2:
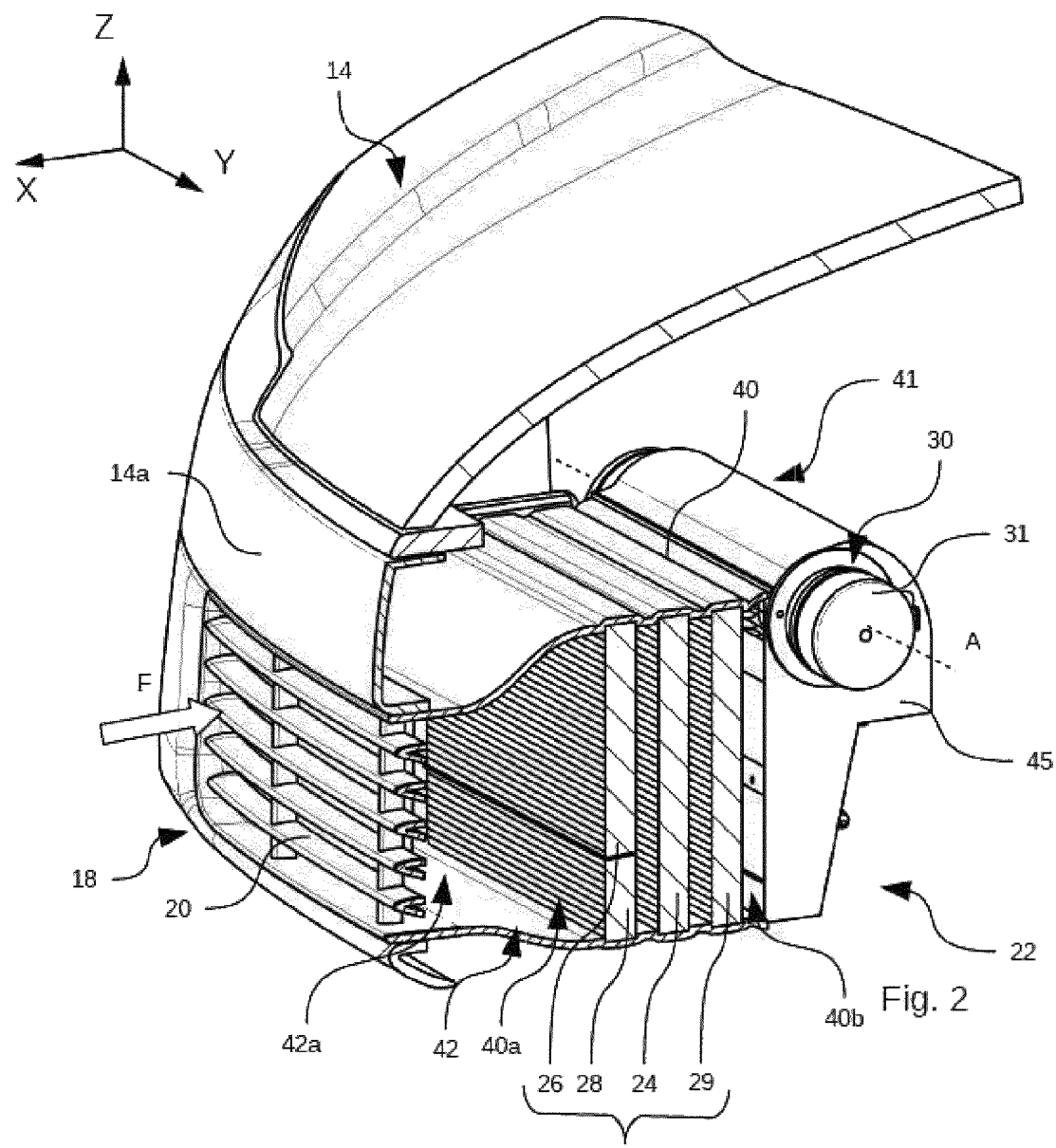
FIG. 2 shows a schematic representation in perspective and in partial cross-section of the front of a motor vehicle and of a cooling module.

In FIGS. 1 and 2, a trihedron XYZ is represented in order to define the orientation of the different elements relative to one another. A first direction, denoted X, corresponds to a longitudinal direction of the vehicle. It also corresponds to the direction of forward movement of the vehicle. A second direction, denoted Y, is a lateral or transverse direction. Finally, a third direction, denoted Z, is vertical. The directions X, Y, Z are orthogonal in pairs.

In the present description, "low" means the position of an element relative to another in the direction Z determined above.

In FIGS. 1 and 2, the cooling module according to the present invention is illustrated in a functional position, i.e. when it is positioned within a motor vehicle.

FIG. 1 illustrates schematically the front part of an electric or hybrid motor vehicle 10 which can comprise an electric motor 12. In particular, the vehicle 10 comprises a body 14 and a fender 16 supported by a chassis (not represented) of the motor vehicle 10. The body 14 defines a cooling opening 18, i.e. an opening through the body 14. In this case, there is only one cooling opening 18. This cooling opening 18 is preferably in the low part of the front face 14a of the body 14. In the example illustrated, the cooling opening 18 is situated below the fender 16. A grille 20 can be positioned in the cooling opening 18 to prevent projectiles from being able to pass through the cooling opening 18. A cooling module 22 is positioned facing the cooling opening 18. The grille 20 makes it possible in particular to protect this cooling module 22.

As shown in FIG. 2, the cooling module 22 is designed to have a flow of air F passing through it parallel to the direction X, and going from the front to the rear of the vehicle 10. The cooling module 22 comprises a set of heat exchangers 23. This set of heat exchangers 23 comprises at least a first heat exchanger 24, a second heat exchanger 26, and a third heat exchanger 28.

The first heat exchanger 24 is configured in particular to dissipate heat energy into the flow of air F. This first heat exchanger 24 can more particularly be a condenser of an air-conditioning circuit A (shown in FIG. 3), or an evaporator-condenser of a reversible air-conditioning circuit A (not represented) which can operate in a cooling mode. This reversible air-conditioning circuit can also permit cooling of the batteries of the vehicle 10.

The third heat exchanger 28 for its part is configured to be a sub-cooler connected within the air-conditioning circuit A. This third heat exchanger 28 is thus also configured to cede heat energy to the flow of air F, with the flow of air F having to discharge the heat energy of the exchangers.

The second heat exchanger 26 is also configured to release heat energy into the flow of air F. This second heat exchanger 26 can more particularly be a radiator connected to a heat control circuit C (shown in FIG. 3) for electrical elements such as the electric motor 12.

Again according to FIG. 2, the cooling module 22 substantially comprises a housing or fairing 40 forming an internal channel between two opposite ends 40a, 40b, and in the interior of which the set of heat exchangers 23 is positioned. This internal channel is preferably oriented parallel to the direction X such that the upstream end 40*a* is oriented toward the front of the vehicle 10, opposite the cooling opening 18, and such that the downstream end 40*b* is oriented toward the rear of the vehicle 10.

The cooling module 22 also comprises a first collector housing 41 positioned downstream from the set of heat exchangers 23 in the direction of circulation of the flow of air. This first collector housing 41 comprises an output 45 for the flow of air F. This first collector housing 41 thus makes it possible to recuperate the flow of air passing through the set of heat exchangers 23, and to orient this flow of air towards the output 45. The first collector housing 41 can be integral with the fairing 40 or it can be an added-on part secured on the downstream end 40*b* of said fairing 40.

The cooling module 22 also comprises at least one tangential fan, also known as a tangential-flow turbomachine 30, which is configured such as to generate the flow of air F destined for the set of heat exchangers 23. The tangential-flow turbomachine 30 comprises a rotor or turbine (or tangential propeller), not represented. The turbine has a substantially cylindrical shape. The turbine advantageously comprises a plurality of stages of blades (or vanes). The turbine is fitted such as to rotate around an axis of rotation A, which for example is parallel to the direction Y. The diameter of the turbine is for example between 35 mm and 200 mm in order to limit its size. The turbomachine 30 is thus compact.

The tangential-flow turbomachine 30 can also comprise a motor 31 which is configured to rotate the turbine. The motor 31 is for example designed to rotate the turbine at a speed of between 200 rpm and 14,000 rpm. This, optionally combined with the diameter of the turbine described in the preceding paragraph, makes it possible in particular to limit the noise generated by the tangential-flow turbomachine 30.

The tangential-flow turbomachine 30 is preferably positioned in the first collector housing 41. The tangential-flow turbomachine 30 is then configured to aspirate air in order to generate the flow of air F passing through the set of heat exchangers 23. The first collector housing 41 then forms a volute at the center of which the turbine 32 is positioned, and from which the evacuation of air at the output 45 of the first collector housing 41 allows the flow of air F to exit.

In the example illustrated in FIG. 2, the tangential-flow turbomachine 30 is in a high position, in particular in the upper third of the first collector housing 41, preferably in the upper quarter of the first collector housing 41. This makes it possible in particular to protect the tangential-flow turbomachine 30 in the case of submersion, and/or to limit the size of the cooling module 22 in its low part.

It is nevertheless possible to conceive that the tangential-flow turbomachine 30 is in a low position, in particular in the lower third of the first collector housing 41. This would make it possible to limit the space taken up by the cooling module 22 in its high part. Alternatively, the tangential-flow turbomachine 30 can be in a median position, in particular in the median third of the height of the first collector housing 41, for example for reasons of integration of the cooling module 22 into its surroundings.

In addition, in the example illustrated in FIG. 2, the tangential-flow turbomachine 30 operates with aspiration, i.e. it aspirates the ambient air so that the air passes through all of the heat exchangers 23. Alternatively, the tangential-flow turbomachine 30 can operate by blowing, blowing the air toward the set of heat exchangers 23. For this purpose, the tangential-flow turbomachine 30 will be positioned upstream from the set of heat exchangers 23.

The cooling module 22 can also comprise a second collector housing 42 positioned upstream from the set of heat exchangers 23. This second collector housing 42 comprises an input 42*a* for the flow of air F coming from the exterior of the vehicle 10. The input 42*a* can in particular be positioned facing the cooling opening 18. This input 42*a* can also comprise the protective grill 20. The second collector housing 42 can be formed from the same material as the fairing 40 (in a single piece), or it can be an added-on part secured at the upstream end 40*a* of said fairing 40.

In addition, the input 42*a* of the second collector housing 42 can comprise a device for closure of the front face (not represented), which device is configured to allow the flow of air F coming from the exterior of the vehicle 10 to pass through said first input 42*a* in an open state, and to close said first input for the flow of air 42*a* in a closed state. The device for closure of the front face can be in different forms, such as, for example, in the form of a plurality of shutters fitted such as to pivot between a position of opening and a position of closure. The shutters can be shutters of the flag type, but other types of shutters such as butterfly shutters can perfectly well be envisaged.

Figure 3:
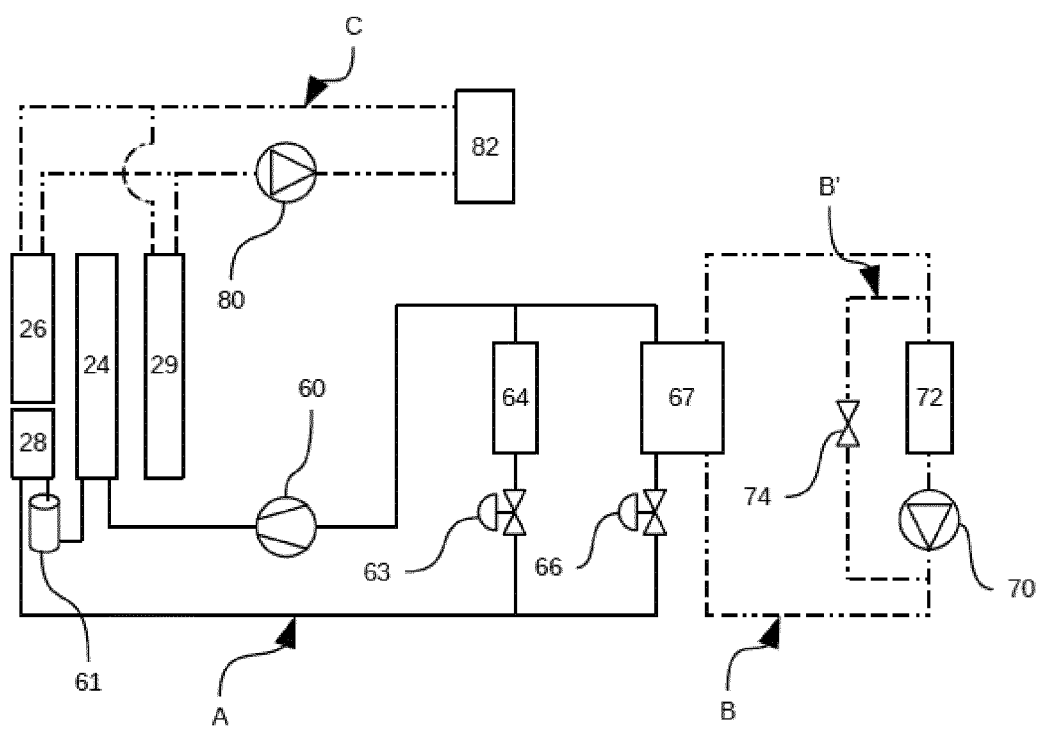
FIG. 3 shows a schematic representation of heat control circuits.

FIG. 3 shows a schematic representation of the air-conditioning circuit A and of the heat control circuit C to which the first 24, second 26 and third 28 heat exchangers are connected.

A heat transfer fluid is designed to circulate in the interior of the heat control circuit C, represented in dot and dash lines. The heat control circuit C can thus comprise the second heat exchanger 26, a pump 80 and a seventh heat exchanger 82, which is for example positioned at the level of electrical elements, such as the electric motor 12 and/or the power electronics.

In the example illustrated in FIGS. 2 and 3, the set of heat exchangers 23 comprises a fourth heat exchanger 29, which is also configured to release heat energy into the flow of air. This fourth heat exchanger 29 can more particularly also be a radiator. In the embodiment illustrated in FIG. 3, this fourth heat exchanger 29 is connected to the heat control circuit C in parallel with the second heat exchanger 26. However, it is perfectly possible to conceive of an embodiment (not represented) in which the fourth heat exchanger 29 is connected to another heat control circuit which is dedicated for example to cooling of the power electronics.

In FIG. 3, the air-conditioning circuit A is represented in solid lines. A cooling fluid is designed to circulate within this air-conditioning circuit. The air-conditioning circuit A comprises, in the direction of circulation of the cooling fluid, a compressor 60 and the first heat exchanger 24, configured to be a condenser designed to have the flow of air F passing through it. Downstream from the first heat exchanger 24, the air-conditioning circuit A comprises the third heat exchanger 28, configured to be a sub-cooler. Downstream from the third heat exchanger 28, the air-conditioning circuit A comprises a first expansion device 63 and an evaporator 64 which is designed for example to have a flow of air destined for the passenger space passing through it.

Between the first 24 and the third 28 heat exchanger, the air-conditioning circuit A can comprise a dehydrating cylinder 61. This dehydrating cylinder 61 is in particular connected within the air-conditioning circuit A downstream from the first heat exchanger 24, between said first heat exchanger 24 and the third heat exchanger 28, in the direction of circulation of the cooling fluid circulating in said air-conditioning circuit A.

The air-conditioning circuit A can comprise a second expansion device 66 and a fifth heat exchanger 67, in order to cool the batteries. The second expansion device 66 and the fifth heat exchanger 67 are positioned in parallel with the first expansion device 63 and the evaporator 64. The fifth heat exchanger 67 can be an evaporator for direct cooling of the batteries, or, as illustrated in FIG. 3, it can be a bi-fluid heat exchanger arranged in conjunction on an appended loop B for indirect cooling of the batteries.

This appended loop B can in particular comprise a pump 70 and a sixth heat exchanger 72, for example a cold plate, in contact with the batteries. The appended loop B can also comprise a branch B' for bypassing of the fifth heat exchanger 67, in order for example to provide homogenization of the temperature of the batteries.

The third heat exchanger 28 is positioned within the set of heat exchangers 23, and is the furthest upstream in the direction of the flow of air F. This allows the exchanger to benefit from the air at the lowest temperature ("coolest air") of the flow of air F. The third heat exchanger 28 can thus assure its function of sub-cooling of the cooling fluid circulating in the air-conditioning circuit A efficiently. The thermal performance, or also the thermal efficiency of the air-conditioning circuit A is thus increased, and its cooling power is for example sufficient to assure at the same time cooling of a flow of air destined for the passenger space and cooling of the batteries.

According to a first embodiment of the set of heat exchangers 23, illustrated in FIGS. 2 to 6, the second heat exchanger 26 is positioned upstream from the first heat exchanger 24 in the flow of air F, within the set of heat exchangers 23. More particularly, the second heat exchanger 26 and the third heat exchanger 28 are positioned on the same plane within the set of heat exchangers 23. This therefore allows the second 26 and third 28 heat exchangers both to be furthest upstream in the direction of circulation of the flow of air F. Thus, both the second 26 and third 28 heat exchangers benefit from the "coolest" air, in order to dissipate heat energy as efficiently as possible.

According to this first embodiment, the cumulative height of the second 26 and the third 28 heat exchangers is substantially equal to that of the first heat exchanger 24. This therefore makes it possible to maintain a set of heat exchangers 23 in which each layer or stratum of heat exchanger has similar dimensions. This also makes it possible to limit the number of heat exchangers which the flow of air F passes through and therefore limits the losses of load. It is thus possible for example to add the fourth heat exchanger 29 downstream from the first heat exchanger 24.

Preferably, according to this first embodiment, the third heat exchanger 28 is positioned below the second heat exchanger 26. "Positioned below" means in this case that, in the fitted state within the motor vehicle 10, the third heat exchanger 28 is situated closer to the ground than the second heat exchanger 26. The heat exchangers 26 and 28 are thus installed one below the other in a direction z.

Figure 4:
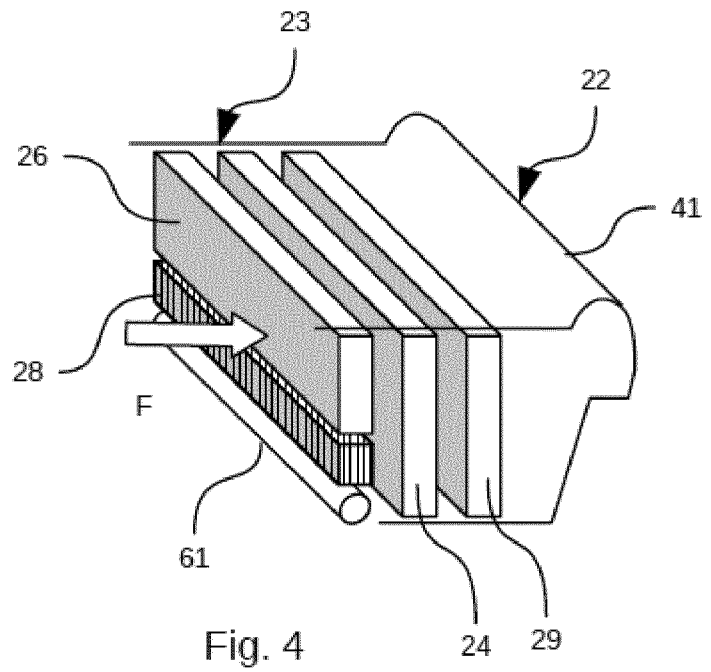
FIG. 4 shows a semi-transparent schematic representation in perspective of a cooling module according to a first embodiment.

According to a first variant, illustrated in FIG. 4, the dehydrating cylinder 61 can be positioned on the same plane as the third heat exchanger 28 within the set of heat exchangers 23. More specifically, the dehydrating cylinder 61 is positioned below the third heat exchanger 28. Thus, according to this variant of the first embodiment, the dehydrating cylinder 61 is on the same plane as both the second 26 and the third 28 heat exchangers. In this variant, the cumulative height of the second 26 and the third 28 heat exchangers and the dehydrating cylinder 61 is substantially equal to that of the first heat exchanger 24.

Figure 5:
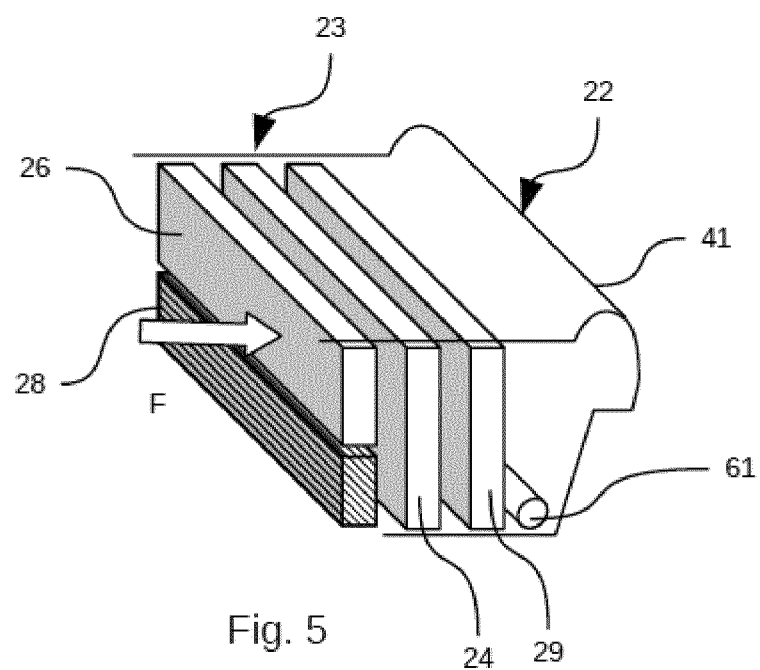
FIG. 5 shows a semi-transparent schematic representation in perspective of a cooling module according to a second embodiment.

According to a second variant, illustrated in FIG. 5, the dehydrating cylinder 61 can be positioned downstream the set of heat exchangers 23 within the first collector housing 41. More particularly, the dehydrating cylinder 61 is positioned in the low part of the first collector housing 41.

Figure 6:
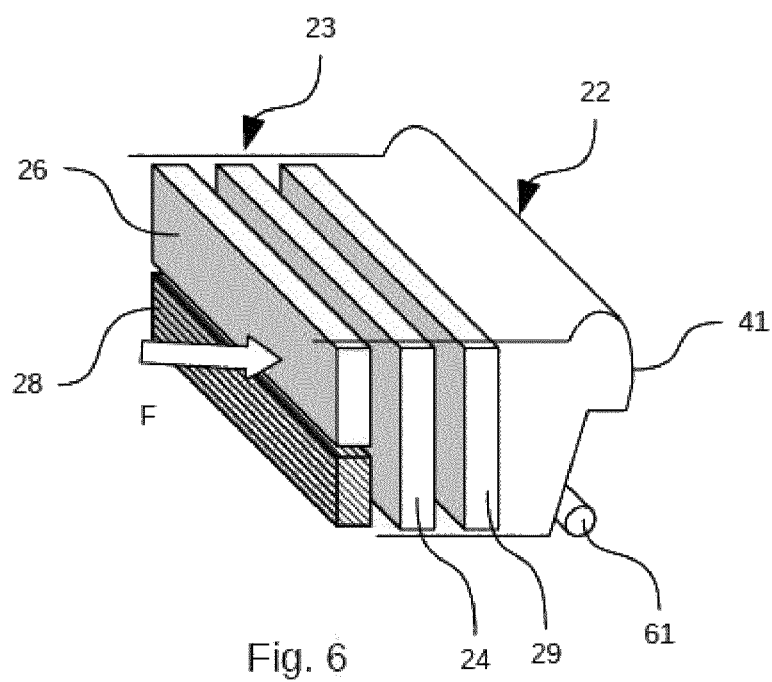
FIG. 6 shows a semi-transparent schematic representation in perspective of a cooling module according to a third embodiment.

According to a third variant, illustrated in FIG. 6, the dehydrating cylinder 61 can be positioned downstream from the set of heat exchangers 23, on the exterior of said first collector housing 41. Similarly, the dehydrating cylinder 61 is preferably positioned in the low part of the first collector housing 41.

The second and third variants make it possible in particular to have a height of the second 26 and third 28 heat exchangers which is not reduced by that of the dehydrating cylinder 61, for a larger exchange surface.

As shown in FIGS. 4 to 6, according to any of the variants cited above, the dehydrating cylinder 61 is positioned such that its axis of extension is positioned parallel to the plane of the heat exchangers 24, 26, 28, 29 of the set of heat exchangers 23. More specifically, the dehydrating cylinder 61 is positioned such that its axis of extension is substantially perpendicular to the axis of the height of the heat exchangers 24, 26, 28, 29 of the set of heat exchangers 23.

Figure 7:
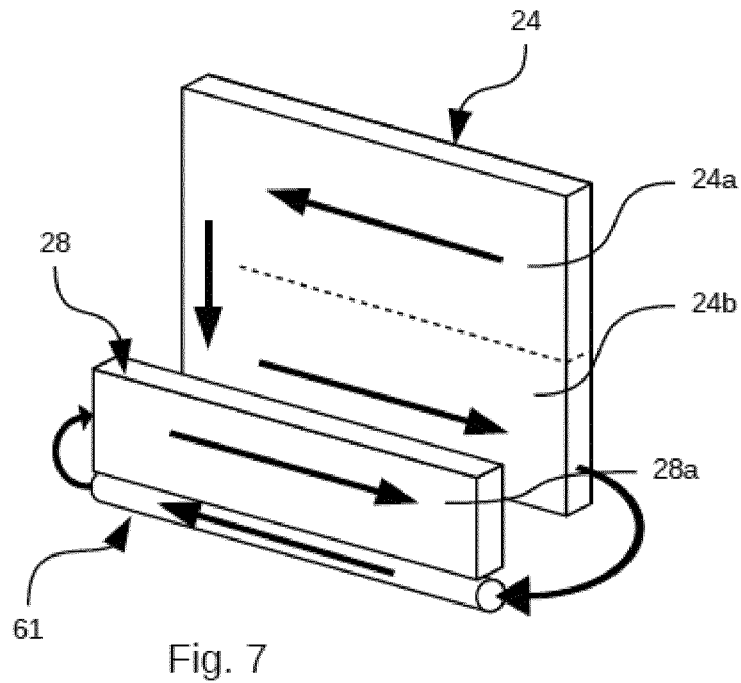
FIG. 7 shows a schematic representation in perspective of a stack of two heat exchangers according to a first variant.
Figure 8:
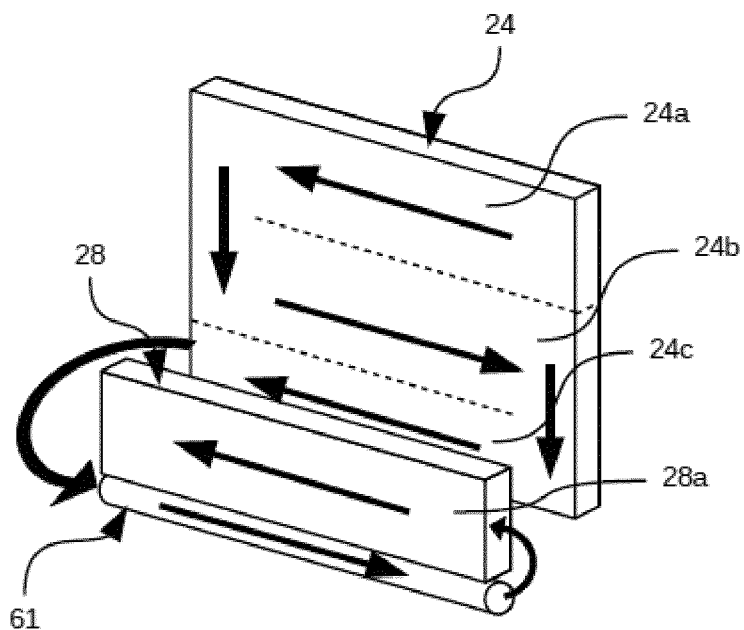
FIG. 8 shows a schematic representation in perspective of a stack of two heat exchangers according to a second variant.

Again according to this first embodiment and as illustrated by FIGS. 7 and 8, the third heat exchanger 28 can in particular be configured to permit passage 28*a* of the cooling fluid circulating in the air-conditioning circuit A. According to a first example illustrated in FIG. 7, the cooling fluid circulates in this passage 28*a* in the opposite direction to in a passage 24*a*, 24*b* positioned facing, within the first heat exchanger 24. The first heat exchanger 24 can thus for example comprise two passages 24*a*, 24*b*, and the third heat exchanger can comprise a single passage 28*a*. The third heat exchanger 28 is thus positioned facing the lowest passage 24*b*, such that the direction of circulation of the heat transfer fluid in the passage 24*a* of the first heat exchanger 24 is in the opposite direction to the direction of circulation of the heat transfer fluid in the passage 28*a* of the third heat exchanger 24.

As shown in FIG. 7, at the first heat exchanger 24, the cooling fluid passes through a first, input passage 24*a*, and reaches a second, output passage 24*b*, in which the cooling fluid circulates in the opposite direction. The input and output of the cooling fluid into and out of the first heat exchanger 24 thus takes place on the same side of said first heat exchanger 24. The cooling fluid then passes into the dehydrating cylinder 61, which it passes through. The cooling fluid input of the dehydrating cylinder 61 is positioned on the same side as the cooling fluid output of the first heat exchanger 24. The cooling fluid output of the dehydrating cylinder 61 is positioned opposite its input. The cooling fluid then passes into the third heat exchanger 28 comprising only one passage 28*a*. The cooling fluid input of the third heat exchanger 28 is on the same side as the output of the dehydrating cylinder 61, and the cooling fluid output of the third heat exchanger 28 is on the same side as the input and output of the first heat exchanger 24. This makes it possible for example to facilitate the connections on the different heat exchangers 24, 28.

According to a second example illustrated by FIG. 8, the cooling fluid circulates in the passage 28*a* in the same direction as in a passage 24*a*, 24*b* positioned opposite, within the first heat exchanger 24. The first heat exchanger 24 can thus for example comprise three passages 24*a*, 24*b*, 24*c*, and the third heat exchanger can comprise a single passage 28*a*. The third heat exchanger 28 is thus positioned facing the lowest passage 24*c*, such that the direction of circulation of the heat transfer fluid in the passage 24*a* of the first heat exchanger 24 is in the direction opposite the direction of circulation of the heat transfer fluid in the passage 28a of the third heat exchanger 24.

As shown in FIG. 8, at the first heat exchanger 24, the cooling fluid passes through a first, input passage 24a, and reaches a second, output passage 24b, in which the cooling fluid circulates in the opposite direction to the first passage 24a. The cooling fluid then passes into a third passage 24c within the first heat exchanger, in which the cooling fluid circulates in the opposite direction to the second passage 24b. The input of the cooling fluid into the first heat exchanger 24 takes place on the side of said first heat exchanger 24 opposite its output. The cooling fluid then passes into the dehydrating cylinder 61, which it passes through. The cooling fluid input of the dehydrating cylinder 61 is positioned on the same side as the cooling fluid output of the first heat exchanger 24. The cooling fluid output of the dehydrating cylinder 61 is positioned opposite its input. The cooling fluid then passes into the third heat exchanger 28 comprising only one passage 28a. The cooling fluid input of the third heat exchanger 28 is on the same side as the output of the dehydrating cylinder 61, and the cooling fluid output of the third heat exchanger 28 is on a side opposite the input of the first heat exchanger 24.

These two examples of FIGS. 7 and 8 make it possible in particular to avoid crossing of branches from one side to the other of the heat exchangers 24, 28 and the dehydrating cylinder 61.

Figure 9:
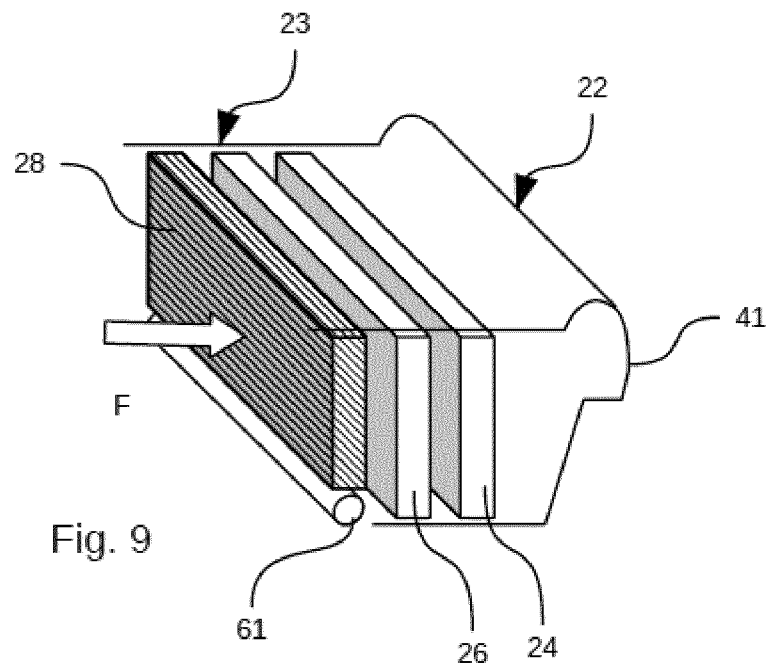
FIG. 9 shows a semi-transparent schematic representation in perspective of a cooling module according to a fourth embodiment.
Figure 10:
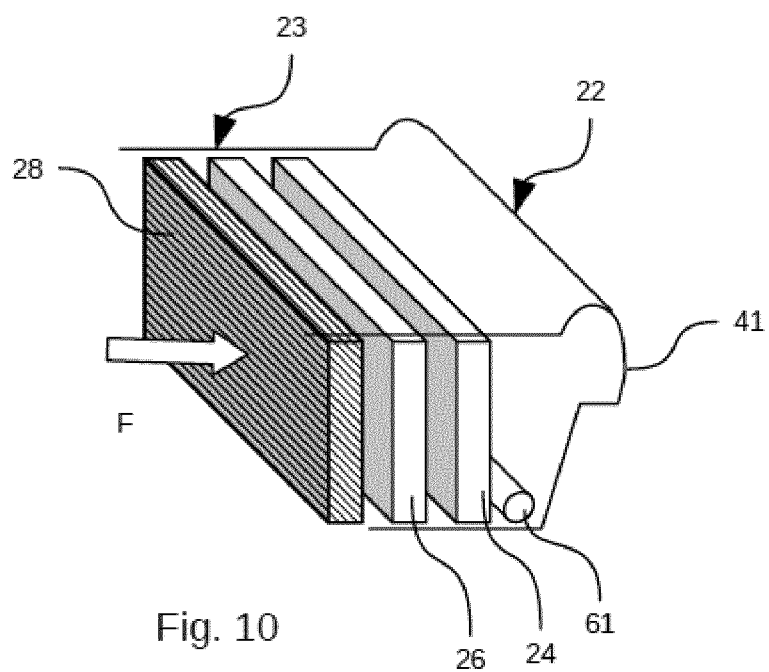
FIG. 10 shows a semi-transparent schematic representation in perspective of a cooling module according to a fifth embodiment.
Figure 11:
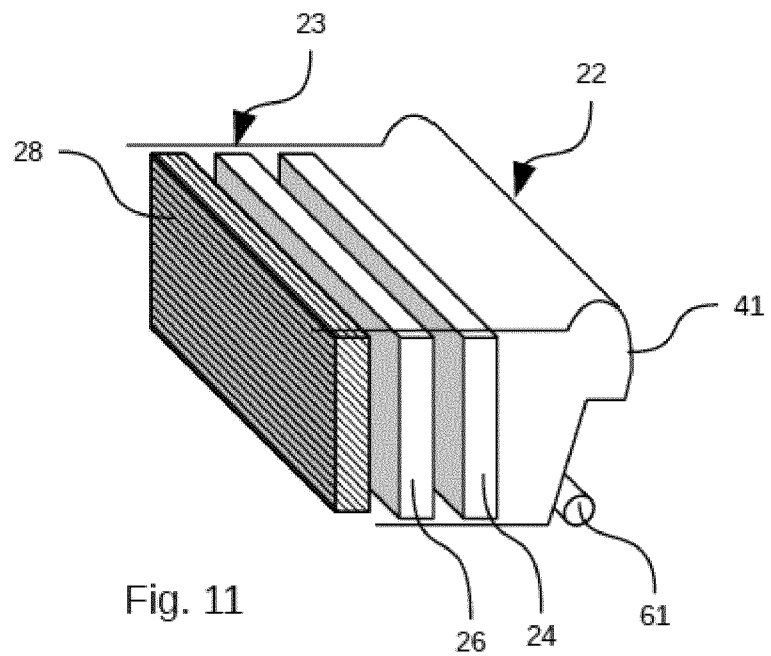
FIG. 11 shows a semi-transparent schematic representation in perspective of a cooling module according to a sixth embodiment.

According to a second embodiment illustrated in FIGS. 9 to 11, the third heat exchanger 28 can be positioned upstream from the second heat exchanger 26. In this case, only the third heat exchanger 28 is furthest downstream in the direction of circulation of the flow of air F, and benefits from the "coolest" air, in order to dissipate heat energy.

According to this second embodiment, the height of the third heat exchanger 28 is substantially equal to that of the first heat exchanger 24. This therefore makes it possible to maintain a set of heat exchangers 23 in which each layer or stratum of heat exchangers has similar dimensions. In order to limit the number of heat exchangers which the flow of air passes through, and thus limit the losses of load, it is therefore preferable not to add the fourth heat exchanger 29.

The dehydrating cylinder 61 can be positioned, as for the first embodiment, such that its axis of extension is positioned in parallel to the plane of the heat exchangers 24, 26, 28, 29 of the set of heat exchangers 23. More specifically, the dehydrating cylinder 61 is positioned such that its axis of extension is perpendicular to the axis of the height of the heat exchangers 24, 26, 28, 29 of the set of heat exchangers 23.

The dehydrating cylinder 61 can also be positioned according to 3 variants. According to a first variant, illustrated in FIG. 9, the dehydrating cylinder 61 can be positioned on the same plane as the third heat exchanger 28 within the set of heat exchangers 23. More specifically, the dehydrating cylinder 61 is positioned below the third heat exchanger 28. In this variant, the cumulative height of the third heat exchanger 28 and the dehydrating cylinder 61 is substantially equal to that of the first heat exchanger 24.

According to a second variant, illustrated in FIG. 10, the dehydrating cylinder 61 can be positioned downstream from the set of heat exchangers 23 within the first collector housing 41. More particularly, the dehydrating cylinder 61 is positioned in the low part of the first collector housing 41.

According to a third variant, illustrated in FIG. 11, the dehydrating cylinder 61 can be positioned downstream from the set of heat exchangers 23, on the exterior of said first collector housing 41. Similarly, the dehydrating cylinder 61 is preferably positioned in the low part of the first collector housing 41.

The second and third variants make it possible in particular to obtain a height of the third heat exchanger 28 which is not reduced by that of the dehydrating cylinder 61, for a larger exchange surface.

Figure 12:
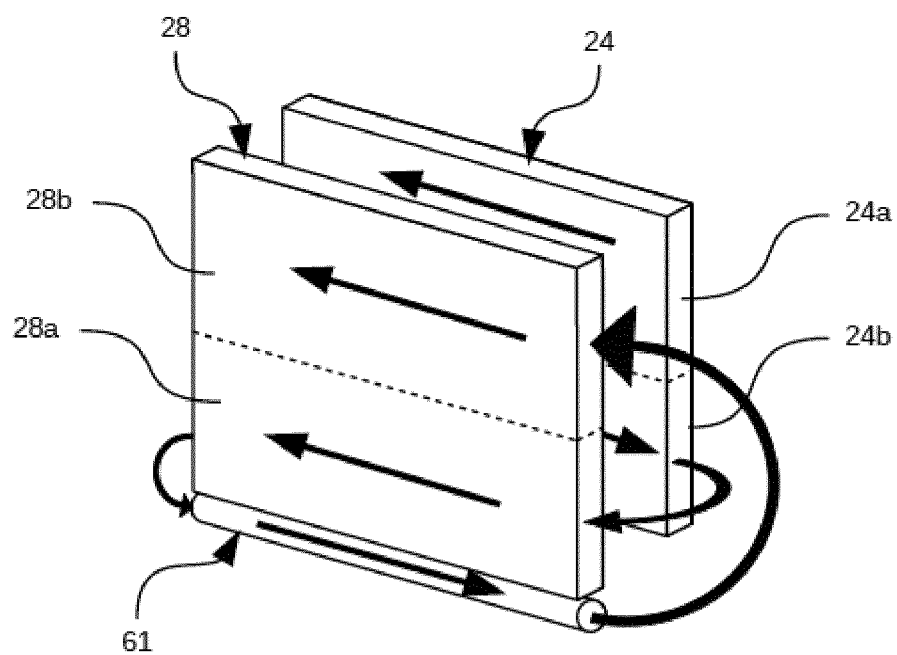
FIG. 12 shows a schematic representation in perspective of a stack of two heat exchangers according to a third variant.

The fact that the third heat exchanger 28 is the furthest downstream in the direction of circulation of the flow of air F allows the exchanger to have dimensions which are sufficient to have more than one passage 28a, 28b for circulation of cooling fluid. As shown in FIG. 12, at the first heat exchanger 24, the cooling fluid passes through a first, input passage 24a, and reaches a second, output passage 24b, in which the cooling fluid circulates in the opposite direction. The input and output of the cooling fluid into and out of the first heat exchanger 24 thus takes place on the same side of said first heat exchanger 24. The cooling fluid then passes into a first passage 28a of the third heat exchanger 28. This first passage is in particular positioned facing the second passage 24b of the first heat exchanger 24. The fluid input which cools this first passage 28a of the third heat exchanger 28 is positioned on the same side as the fluid output which cools the second passage 24b of the first heat exchanger 24. The cooling fluid exits from the third heat exchanger 28, and more specifically from its first passage 28a, opposite its input. The cooling fluid then passes into the dehydrating cylinder 61, which it passes through. The cooling fluid input of the dehydrating cylinder 61 is positioned on the same side as the cooling fluid output of the first passage 28a of the third heat exchanger 28. The cooling fluid output of the dehydrating cylinder 61 is positioned opposite its input. The cooling fluid then passes into a second passage 28b of the third heat exchanger 28. The cooling fluid input of the second passage 28b of the third heat exchanger 28 is on the same side as the output of the dehydrating cylinder 61, and the cooling fluid output of the second passage 28b of the third heat exchanger 28 is on the side opposite the input and output of the first heat exchanger 24. The first 28a and second 28b passages of the third heat exchanger 28 are in particular positioned one above the other, the first passage 28a being the one which is positioned at the bottom of the third heat exchanger 28. The cooling fluid circulates in the same direction within the first 28a and second 28b passages of the third heat exchanger 28.

As for the two examples in FIGS. 7 and 8, this example of FIG. 12 makes it possible to avoid crossing of branches from one side to the other of the heat exchangers 24, 28 and the dehydrating cylinder 61.

Thus, it can be seen clearly that the fact of positioning the third, sub-cooling heat exchanger 28 the furthest forward makes it possible to improve the performance levels of the air-conditioning circuit A, within the context of a cooling module 22 designed and adapted for electric and hybrid vehicles.

The invention claimed is:

1. A cooling module for an electric or hybrid motor vehicle, said cooling module being designed to have a flow of air passing through it, and comprising:
 a set of heat exchangers comprising:
  a first heat exchanger configured to be a condenser connected within an air-conditioning circuit, and
  a second heat exchanger configured to be a low-temperature radiator connected within a heat control circuit; and
 a tangential-flow turbomachine configured such as to generate the flow of air, wherein the set of heat exchangers also comprises a third heat exchanger which is configured to be a sub-cooler connected within the air-conditioning circuit, said third heat exchanger being positioned within the set of heat exchangers which is furthest upstream in the direction of the flow of air, wherein the second heat exchanger is positioned upstream from the first heat exchanger in the flow of air within the set of heat exchangers, and wherein, within the set of heat exchangers, the second heat exchanger and the third heat exchanger are positioned on a same plane and are the furthest upstream in the direction of the flow of air.

2. The cooling module as claimed in claim 1, wherein the third heat exchanger is positioned below the second heat exchanger.

3. The cooling module as claimed in claim 1, wherein the set of heat exchangers comprises a fourth heat exchanger which is configured to be a low-temperature radiator, and is positioned downstream from the first heat exchanger in the flow of air.

4. The cooling module as claimed in claim 3, wherein the fourth heat exchanger is connected to the heat control circuit in parallel with the second heat exchanger.

5. The cooling module as claimed in claim 3, wherein the fourth heat exchanger is connected to an appended heat control circuit distinct from the heat control circuit to which the second heat exchanger is connected.

6. The cooling module as claimed in claim 1, further comprising: a dehydrating cylinder, said dehydrating cylinder being connected within the air-conditioning circuit downstream from the first heat exchanger, between said first heat exchanger and the third heat exchanger, in the direction of circulation of a cooling fluid circulating in said air-conditioning circuit.

7. The cooling module as claimed in claim 1, wherein the low-temperature radiator is connected to an electric motor.

8. The cooling module as claimed in claim 1, wherein the first heat exchanger comprises a first passage and a second passage that circulate a heat transfer fluid, and wherein the heat transfer fluid in the first passage circulates in an opposite direction to the heat transfer fluid in the second passage.

* * * * *